Figure 8:
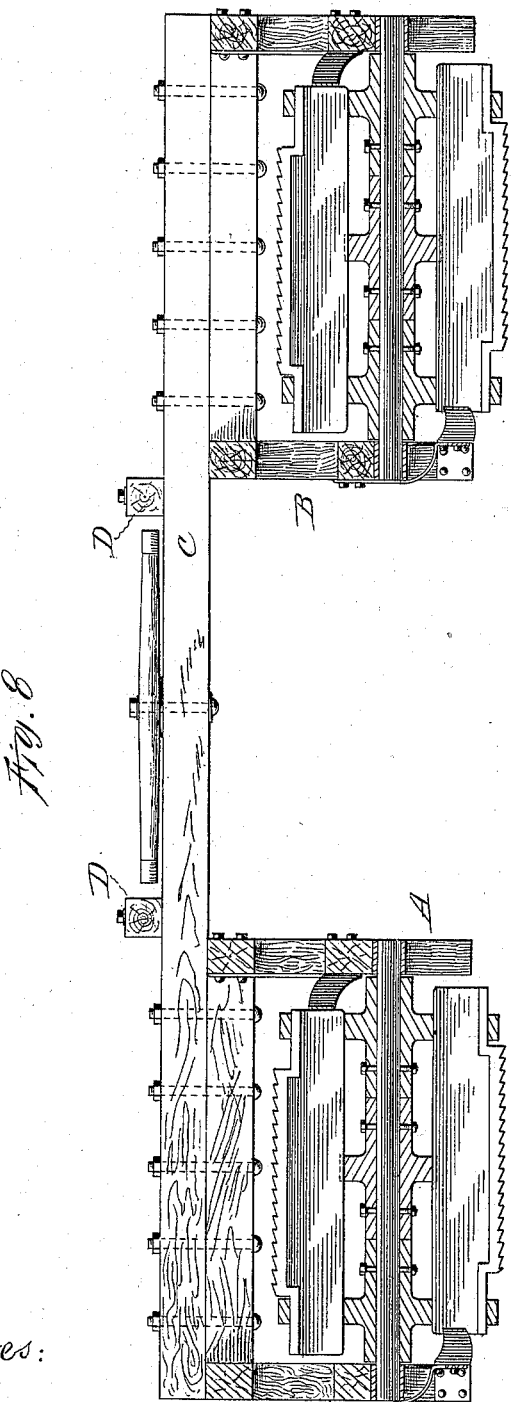

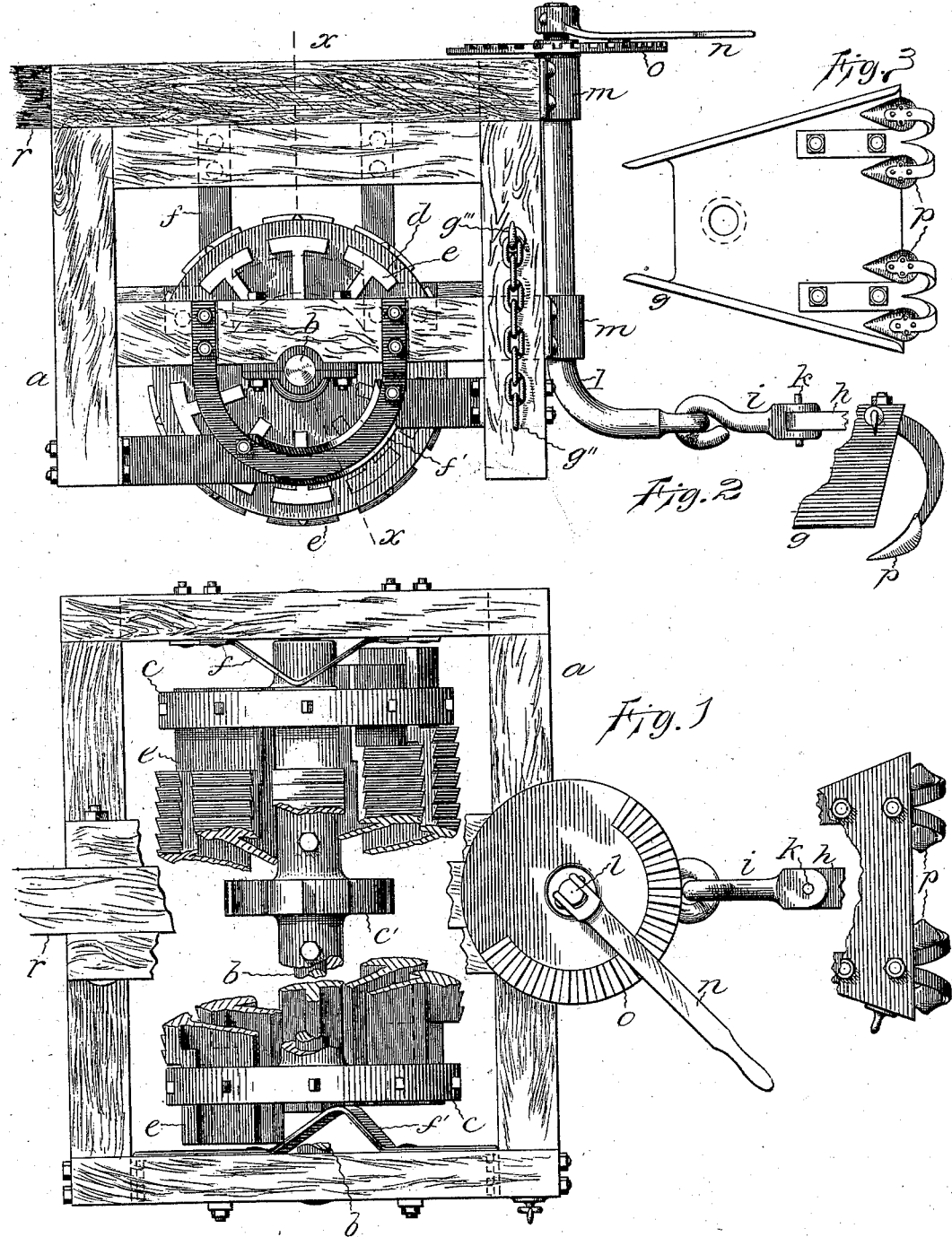

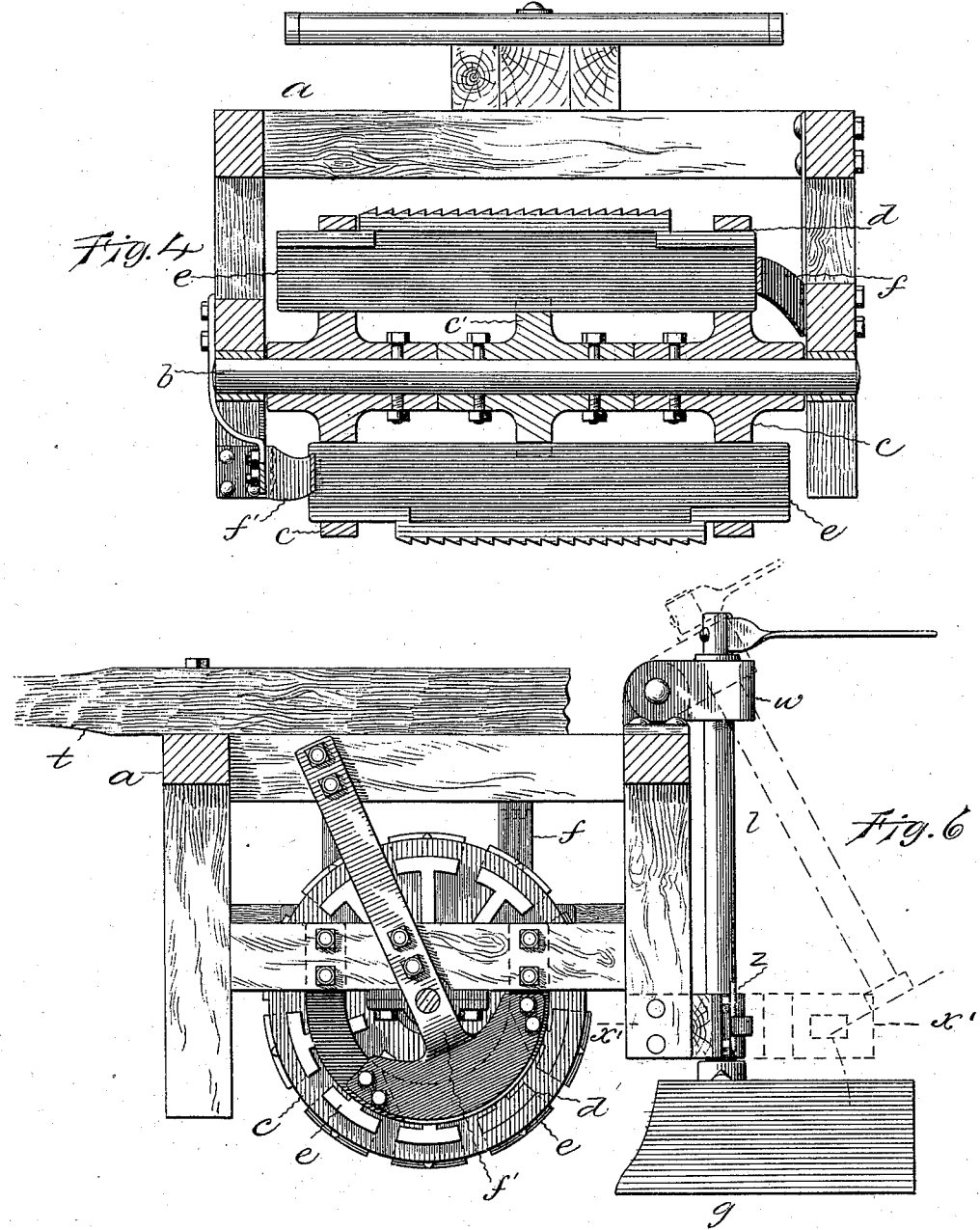

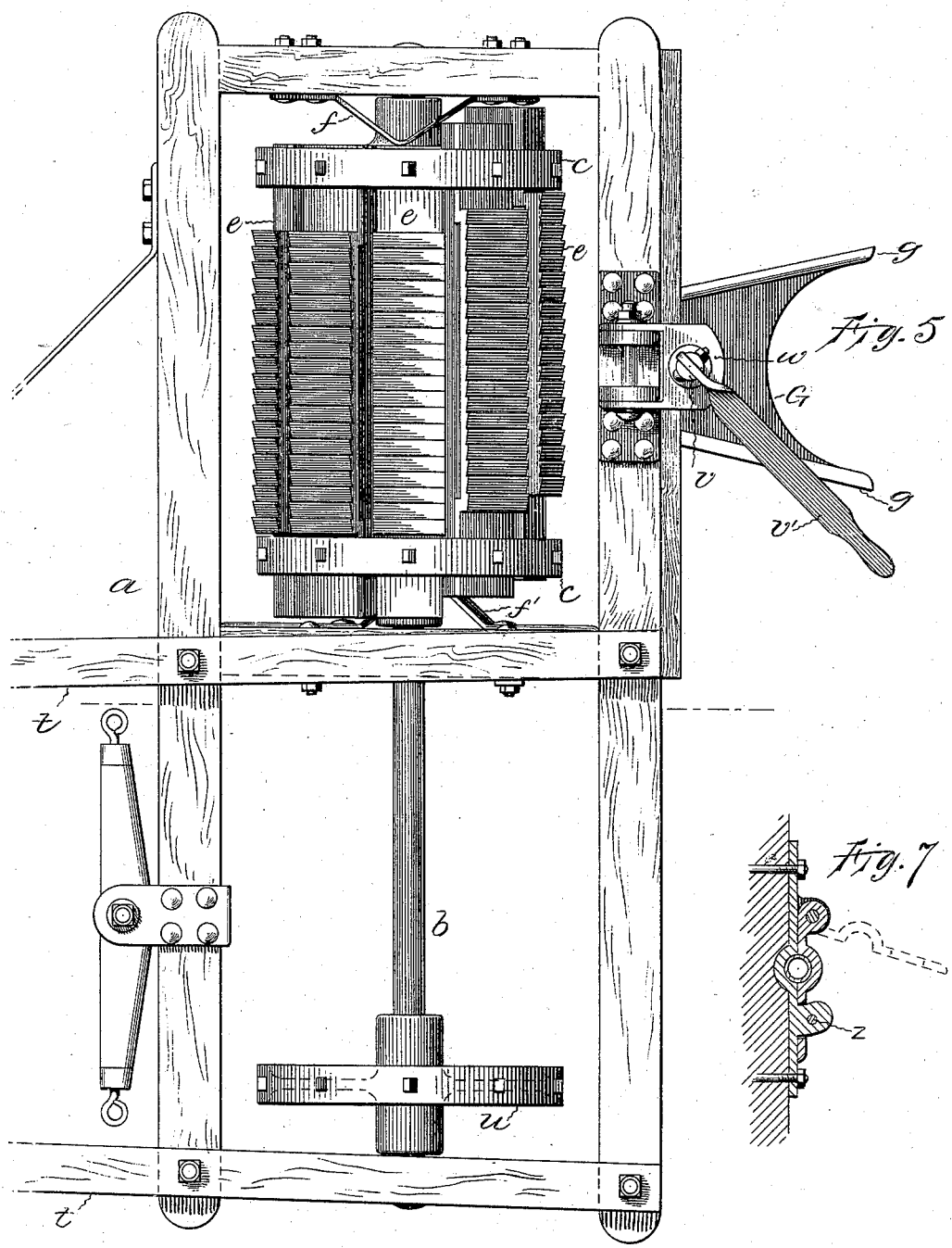

(No Model.)
4 Sheets—Sheet 4.

R. J. GATLING.
COMBINED COTTON THINNER AND CULTIVATOR.

No. 558,682.
Patented Apr. 21, 1896.

Witnesses:
C. E. Buckland.
Andrew Ferguson.

Inventor:
Richard J. Gatling
By W. E. Simonds
Attorney

UNITED STATES PATENT OFFICE.

RICHARD J. GATLING, OF HARTFORD, CONNECTICUT.

COMBINED COTTON THINNER AND CULTIVATOR.

SPECIFICATION forming part of Letters Patent No. 558,682, dated April 21, 1896.

Application filed January 22, 1896. Serial No. 576,439. (No model.)

*To all whom it may concern:*

Be it known that I, RICHARD J. GATLING, a citizen of the United States of America, residing at Hartford, in the county of Hartford and State of Connecticut, have invented a certain new and useful Improvement in a Combined Cotton Thinner and Cultivator, of which the following is a description, reference being had to the accompanying drawings, wherein—

Figure 1 is a plan view of a machine embodying said improvement with certain parts represented as broken away in order to show the construction beyond such broken parts. Fig. 2 is an end or side elevation of the same machine shown in Fig. 1. Fig. 3 is a detail under side view of the double scraper and plows. Fig. 4 is a view in sectional elevation of the machine shown in Figs. 1 and 2 on the plane denoted by the dotted line $x\,x$ of Fig. 2. Fig. 5 is a plan view of a modification. (Figs. 1, 2, 3, and 4 pertain to a two-horse machine. Fig. 5 pertains to a one-horse machine.) Fig. 6 is a side or end elevation of the same machine that is shown in Fig. 5. Fig. 7 is a detail sectional view on the plane $x'\,x'$ of Fig. 6. Fig. 8 is a plan view of a modification of the machine more especially adapted for breaking up old rows of cotton-stalks between crops.

The object of the improvement is the production of a machine for thinning out young cotton-plants in the rows, and at the same time cultivating the ground on both sides of the rows. In raising cotton-plants it is customary to have the plants in rows which need to be thinned out when the plants are young, so as to leave intervals of free ground from one bunch of plants to another. This machine is intended for effecting that end, and also for cultivating the ground at the same time.

In the accompanying drawings the letter $a$ denotes the frame of the machine.

$b$ denotes the main shaft, properly journaled to the frame of the machine and carrying the wheels or disks $c$. The wheels $c$ are perforated laterally by mortises $d$, which are, by preference, approximately T-shaped, the upright of the T being radial and the top of the T being, by preference, conformable to the part of a circle. These mortises $d$ support and carry what I will call the "hoe-slides" $e$, which bear corrugated, serrated, or roughened faces.

The letter $c'$ denotes support for the hoe-slides intermediate of the wheels $c$. These hoe-slides are capable of and practically have, as the wheels $c$ rotate, a certain lateral reciprocation.

The letter $f$ denotes a cam-surface attached to the frame of the machine, which, as the hoe-slides approach and pass it, throw the hoe-slides laterally in one direction.

The letter $f'$ denotes another cam-surface suitably attached to the frame of the machine, which, as the hoe-slides approach and pass it, throws said hoe-slides laterally in the opposite direction. The cam-surface $f$ is approximately at the top of the circle in which the hoe-slides rotate (or move with the wheels) and the cam-surface $f'$ is near the bottom of the circle. By reason of the presence of these two cam-surfaces $f$ and $f'$, located as described, it results that each of the hoe-slides is made to reciprocate laterally of the path of the machine once in each direction during a single revolution of the wheels $c$. When the hoe-slides are thus reciprocated by virtue of their end contact with the cam-surface $f'$, they thin the plants in the row—that is, cut out and remove a part of them, leaving standing such plants as enter and correspond to the intervals between the hoe-slides.

It will be understood from what has just been said that the wheels $c$ travel on the ground on each side of the row of cotton-plants, the row of plants being continually between the wheels.

The letter G denotes as a whole what I call the "scraper." It is provided with the two scraper-blades $g$, which converge toward each other from rear to front. Its neap $h$ is attached to the link $i$ by the wooden pin $k$, which pin is made of wood in order that it may break if the scraper strikes a heavy stone or other obstacle and thereby save the breakage of more important parts. The link $i$ is attached by a loose joint to the lateral arm of the cranked shaft $l$, which is attached vertically to the frame of the machine by suitable journal-boxes $m$. At its upper end the shaft $l$ has a handle-lever $n$ hinged thereto. The letter $o$ denotes a toothed rack for holding the handle-lever $n$, and consequently the scraper $g$, in any desired lateral adjustment. The scraper $g$ is provided with the shovel-plows $p$, which help cultivate the surface of the ground and remove the grass and weeds from both sides of the row of plants. The scraper $g$ and the hooks or shovel-plows $p$ straddle the rows of cotton-plants, cultivate the soil, removing the grass and weeds and scraping and shoveling the dirt from the rows of cotton-plants while the shovel-plows that are attached to the scraper cultivate the soil on each side of the row.

The scraper G can be turned up when not in use and held in that position by the chain $g''$ taking into the hook $g'''$. The shaft $l$ may be made vertically adjustable, if desired.

So far this description has been confined to Figs. 1 to 4, inclusive, which show a two-horse machine, and therein the letter $r$ denotes the draft-pole, at the sides of which the draft-animals are attached.

In Figs. 5, 6, and 7 I illustrate a modification—a one-horse machine. Its laterally-reciprocating hoe-slides are just the same in construction and operation as those already described, but the frame has shafts $t$ at one side for a single draft-animal. It also has an extra wheel $u$ to prevent the frame from tilting. The scraper G is substantially the same in construction as that already described. It is attached to a vertical shaft $v$, which has a handle $v'$, and by means thereof can be adjusted rotarily. The upper journal-box $w$ is hinged to the frame of the machine, so that on occasion—that is, when a heavy obstacle is struck—it may give way, as indicated in dotted lines in Fig. 6. The lower journal-box $y$ is hinged at one end and screwed in place at the other end by a wooden pin $z$, which is made of wood in order that when the scraper strikes an obstacle of magnitude this wooden pin may break and so save more important parts from breakage.

The modification of the machine shown in Fig. 8 is well adapted for destroying and breaking up rows of old cotton-stalks standing in the field, this being something necessary to be done after one crop of cotton is gathered and before another is planted. For this purpose the frames A and B, carrying the rotary hoe-slides, are so fastened by bolts or the like to cross-bar C as to be adjustable toward and from each other. The machine thus modified operates on two rows at the same time, and the aforesaid adjustment is for the purpose of adjusting it for operation on rows of different widths.

The letter D denotes shafts for the draft-animal.

I claim as my improvement—

1. In combination, the frame of the machine, the main shaft $b$, the wheels $c$, the hoe-slides $e$ having corrugated, serrated or roughened working faces, and reciprocating at an angle to the path of the machine, and the cam-surfaces $ff'$, all substantially as described and for the purposes set forth.

2. The T-shaped hoe-slides $e$ combined with the wheels $c$ having correspondingly T-shaped mortises, all substantially as described and for the purposes set forth.

3. The wheels $c$ carrying the laterally-reciprocating hoe-slides $e$ combined with the laterally-adjustable scraper G having converging scraper-blades $g$, all substantially as described and for the purposes set forth.

4. In combination, the scraper G having converging scraper-blades $g$, the crank-shaft $l$, the handle-lever $n$, and the rack $o$, all substantially as described and for the purposes set forth.

5. In combination, the scraper G having converging scraper-blades $g$ and shovel-plows $p$, the crank-shaft $l$, the handle-lever $n$, and the rack $o$, all substantially as described and for the purposes set forth.

RICHARD J. GATLING.

Witnesses:
W. E. SIMONDS,
ANDREW FERGUSON.